(No Model.) 2 Sheets—Sheet 2.
E. HARTZELL & D. B. ROCK.
LAWN MOWER.
No. 539,513. Patented May 21, 1895.
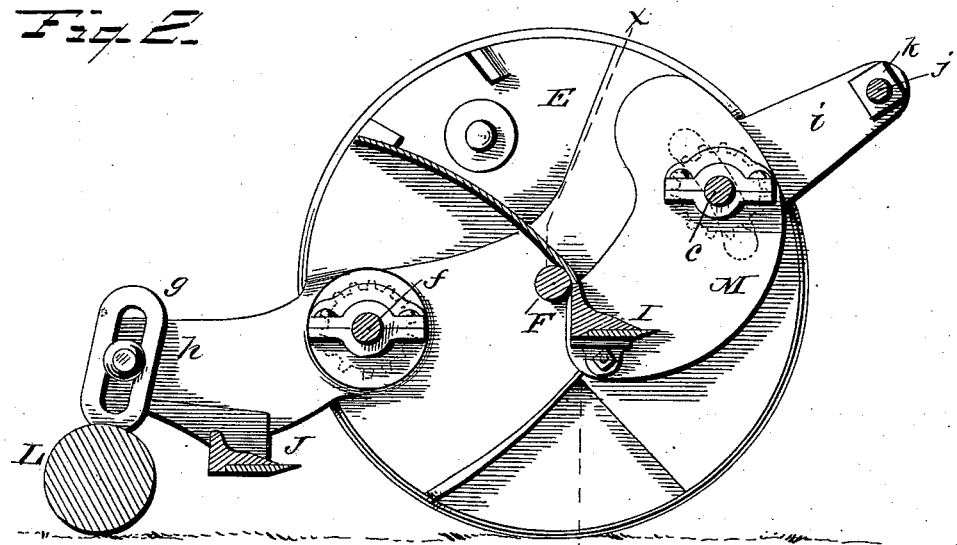
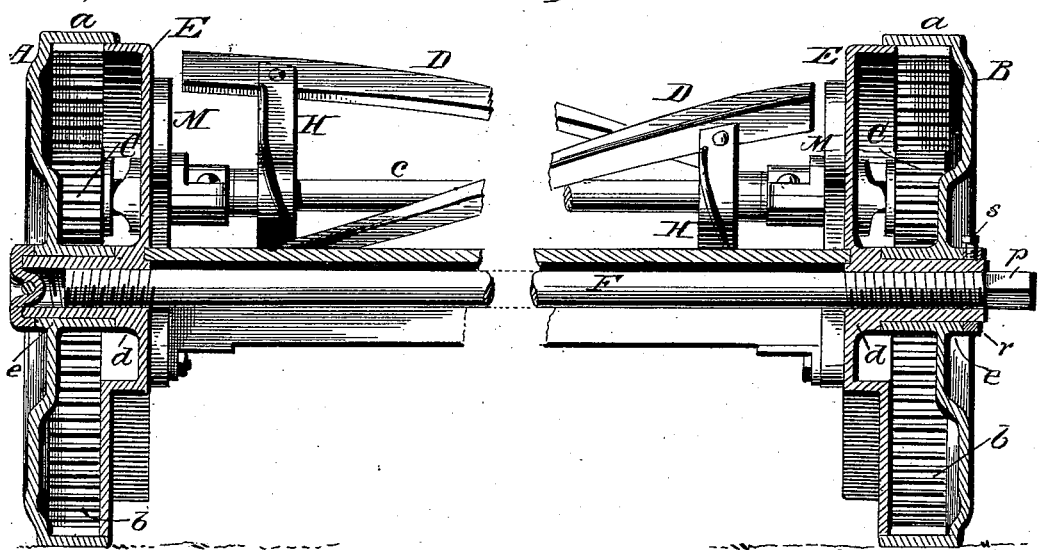
Witnesses
C. J. Williamson
G. Goddard
Inventors
Emmert Hartzell;
Daniel B. Rock.
per Chas. H. Fowler
Attorney.

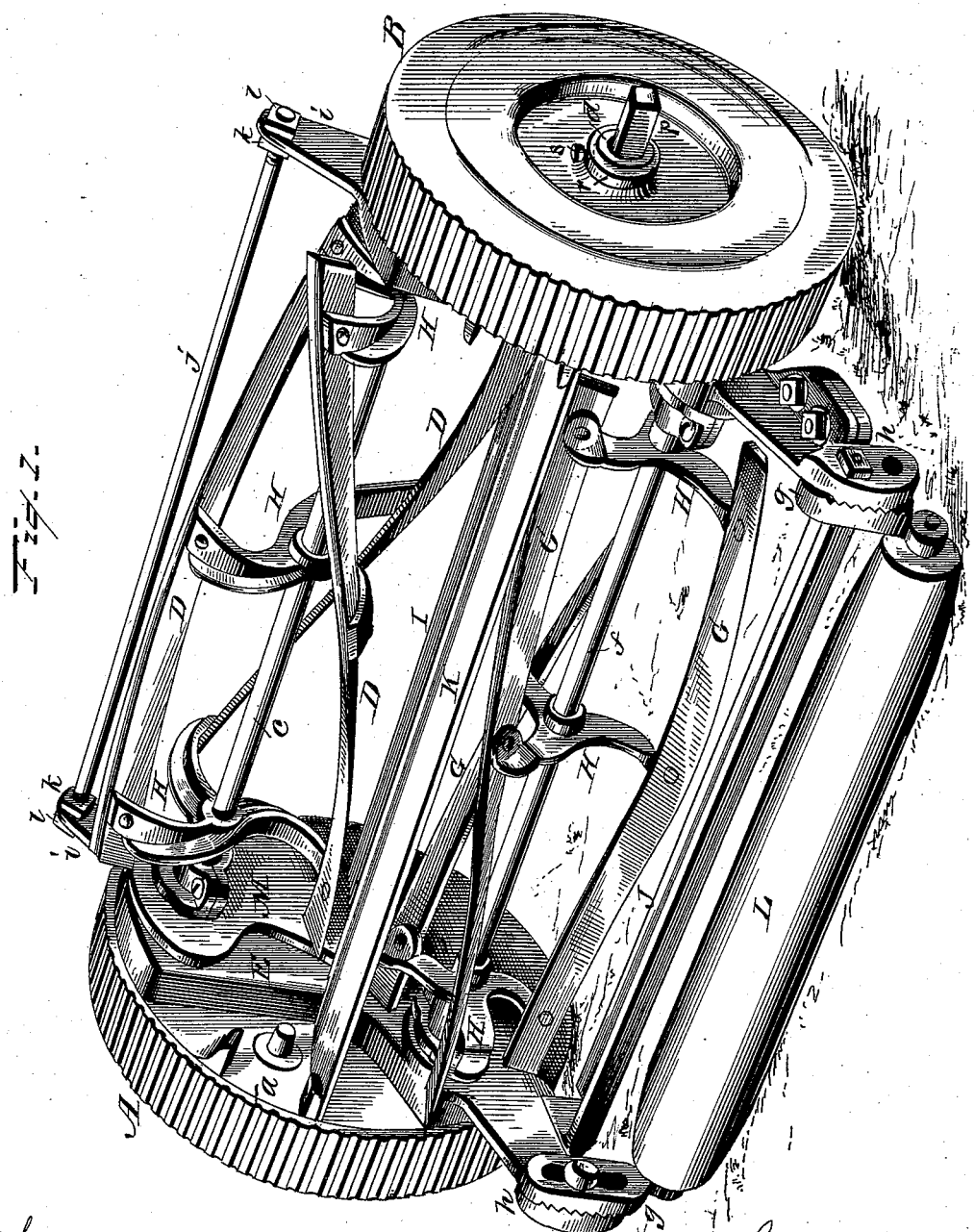

UNITED STATES PATENT OFFICE.

EMMERT HARTZELL AND DANIEL B. ROCK, OF FAIRFIELD, ASSIGNORS TO THE SUPPLEE HARDWARE COMPANY, OF PHILADELPHIA, PENNSYLVANIA.

LAWN-MOWER.

SPECIFICATION forming part of Letters Patent No. 539,513, dated May 21, 1895.

Application filed October 19, 1894. Serial No. 526,365. (No model.)

*To all whom it may concern:*

Be it known that we, EMMERT HARTZELL and DANIEL B. ROCK, citizens of the United States, residing at Fairfield, in the county of Adams and State of Pennsylvania, have invented certain new and useful Improvements in Lawn-Mowers; and we do hereby declare that the following is a full, clear, and exact description of the same, reference being had to the annexed drawings, making a part of this specification, and to the letters of reference marked thereon.

The present invention has for its object to provide a lawn-mower with two sets of revolving cutters that will be simple in construction, effective in operation in cutting high or low grass, and will possess the necessary strength and durability with comparative lightness and therefore materially enhancing its value as a garden implement or device.

The several objects above set forth are attained by a lawn-mower constructed substantially as shown in the drawings and hereinafter described and claimed.

Figure 1 of the drawings is a perspective view of a lawn-mower constructed in accordance with our invention; Fig. 2, a sectional elevation thereof; Fig. 3, a longitudinal section of the lawn-mower, taken on line $x$ $x$ of Fig. 2; Fig. 4, a detail view in perspective, showing a portion of the two clamping-plates with toothed segments adapted to engage with each other.

In the accompanying drawings, A B represent the two drive wheels which have inwardly extending rims $a$ which are grooved or otherwise roughened upon their exterior as shown to form a better frictional contact with the ground and prevent them from slipping. The inner sides of the flanges of the wheels have an internal gear $b$ with which engage pinions C upon the ends of a shaft $c$ whereby said shaft is caused to rotate when the drive-wheels are in motion. Upon this shaft is keyed or otherwise securely fastened the spiral cutter blades D which may be of the usual construction, the ends of the shaft extending through cap-plates E which cover the interior of the wheels A B.

The cap-plates E have hubs $d$ which extend through the hubs $e$ of the drive wheels and are screw threaded upon their interior to receive the screw threaded ends of the axle F.

A second rotary cutter is provided which consists of the spiral cutter-blades G connected in any suitable manner with the shaft $f$ so that the blades will be carried around with the shaft when rotated. The blades of each cutter are connected to spiders H which spiders are securely fastened to their respective shafts by set-screws or other preferred means.

Stationary knives I J are located respectively under the cutters and may be of the usual construction, and at a point between the cutters is a division plate K to prevent the grass which is cut by the upper cutter from falling upon and clogging the lower cutter. The usual roller L to prevent the lower cutter from coming in contact with the ground, has its bearings in vertically adjustable plates $g$. These plates have ratchet faces which engage with corresponding faces upon the inner sides of the arms $h$ which project from the cap-plates E, said plates $g$ being held in their adjusted position by means of screw bolts and nuts, said bolts passing through slots in the plates, or any other preferred means may be employed for rendering the roller vertically adjustable to regulate the height of the lower cutter from the ground.

The cap-plates E have projecting arms $i$ to which are connected the ends of a brace-rod $j$ by means of nuts $k$ $l$ engaging with the screw threaded ends of the rods upon each side of the arms as shown in Fig. 1 of the drawings.

The ends of the shaft $f$ of the lower cutter have suitable pinions as shown in dotted lines of Fig. 2, said pinions like those upon the ends of the shaft of the upper cutter, engaging with the internal gear of the flanges upon the drive wheels. The several parts however, as above described, are the usual means employed for imparting to the cutters a rotary motion, and therefore no claim is made thereto.

The several parts of the device herein described may be variously modified or changed in the details of construction without departing from the principle of the invention.

The essential feature of the invention resides in the means employed for rendering the upper cutter vertically adjustable whereby its height may be regulated to adapt it for cutting high or low grass. To attain this end the cap-plates E are provided with curved slots $m$ through which the ends of the shaft $c$ extend and also through holes $n$ in supplemental plates M. The curved slots in the cap-plates admit one of supplemental plates being moved up or down and carry with it the shaft, the supplemental plates at their lower ends being pivoted in any suitable manner to the cap-plates so that they can swing upon their pivotal connections to raise or lower them. When the plates are adjusted to the proper height which determine the height of the upper cutter, it is necessary that the plates be held against the cap-plates without danger of slipping thereon, and to secure this object the plates E are provided with toothed segments N with which engage similar segments O upon the inner faces of the supplemental plates M, as shown in Fig. 4 of the drawings.

In order to clamp the supplemental plates against the cap-plates, the latter plates are drawn together after said supplemental plates have been properly adjusted, and to provide for this, the axle F is screw threaded upon its ends with the screw threads upon the hubs $d$ of the cap-plates E.

To enable the axle to be conveniently turned to increase or diminish the space between the cap-plates by means of the screw threads upon the interior of the hubs, one end of the axle is flat-sided as shown at $p$ for the engagement therewith of a wrench or other suitable tool by which it may be turned.

When it is desired to adjust the supplemental plates M, the axle F is turned in the proper direction to increase the distance between the cap-plates E and remove the pressure thereof upon the supplemental plates. This will allow the supplemental plates to be released from the notched or toothed segments and its height varied as circumstances require, after which the axle is turned in the opposite direction to bring the cap-plates nearer together to clamp the supplemental plates and hold them in their adjusted positions. A collar $r$ is connected to the hub $d$ of one of the cap-plates E by means of a set-screw $s$ to hold the hub of the wheel in position thereon, and the opposite wheel is held in position by means of a cap $t$ or any other convenient means found best adapted to the purpose.

The lawn-mower may be provided with the usual handle for operating it, which is not considered necessary to show in the drawings.

Having now fully described our invention, what we claim as new, and desire to secure by Letters Patent, is—

1. In a lawn-mower, cap-plates provided with hubs having right and left interior screw threads, plates adjustably connected to the cap-plates, a cutter having its shaft supported in the adjustable plates, an axle having its ends screw threaded to correspond with the threads of the hub and engaging therewith, and having its end adapted to receive a suitable tool for turning it, and drive wheels mounted upon the hubs of the plates, substantially as and for the purpose set forth.

2. In a lawn-mower, two independently rotary cutters, means for rendering the upper one of said cutters vertically adjustable, consisting of pivoted supplemental plates through which the ends of the cutter-shaft extend, toothed segments upon said plates, flanged cap-plates having toothed segments to engage with those on the supplemental plates, and curved slots in the cap-plates through which the ends of the shaft pass, and a right and left screw threaded rod connecting the cap-plates and operating to draw them in a direction toward each other to hold the cutter in its adjusted position, substantially as and for the purpose specified.

In testimony that we claim the above we have hereunto subscribed our names in the presence of two witnesses.

EMMERT HARTZELL.
DANIEL B. ROCK.

Witnesses:
GEO. E. SANDERS,
WM. H. LOW.